S. F. ZENGER.
POULTRY FEEDER.
APPLICATION FILED FEB. 20, 1915.

1,162,010.

Patented Nov. 30, 1915.

Inventor
S. F. Zenger.

Witnesses

By

Attorneys.

UNITED STATES PATENT OFFICE.

SIMON F. ZENGER, OF COVINGTON, PENNSYLVANIA.

POULTRY-FEEDER.

1,162,010.   Specification of Letters Patent.   Patented Nov. 30, 1915.

Application filed February 20, 1915. Serial No. 9,703.

*To all whom it may concern:*

Be it known that I, SIMON F. ZENGER, a citizen of the Republic of Switzerland, residing at Covington, in the county of Tioga and State of Pennsylvania, have invented certain new and useful Improvements in Poultry-Feeders, of which the following is a specification.

This invention relates to poultry feeders and has for its object the provision of a simple inexpensive, durable and efficient device by which chickens and other poultry may obtain feed without causing waste of the same and yet in sufficient quantities to properly nourish them.

A secondary object of the invention is to provide a cheap and simple device which may be easily adjusted to permit the feed to fall to the ground in the proper quantities and may be adjusted to different kinds of feed.

These stated objects and such other objects as will incidentally appear as the description of the same proceeds are attained in mechanism of the character illustrated in the accompanying drawing and the invention resides in certain novel features which will be particularly pointed out in the claims following the description.

Figure 1:
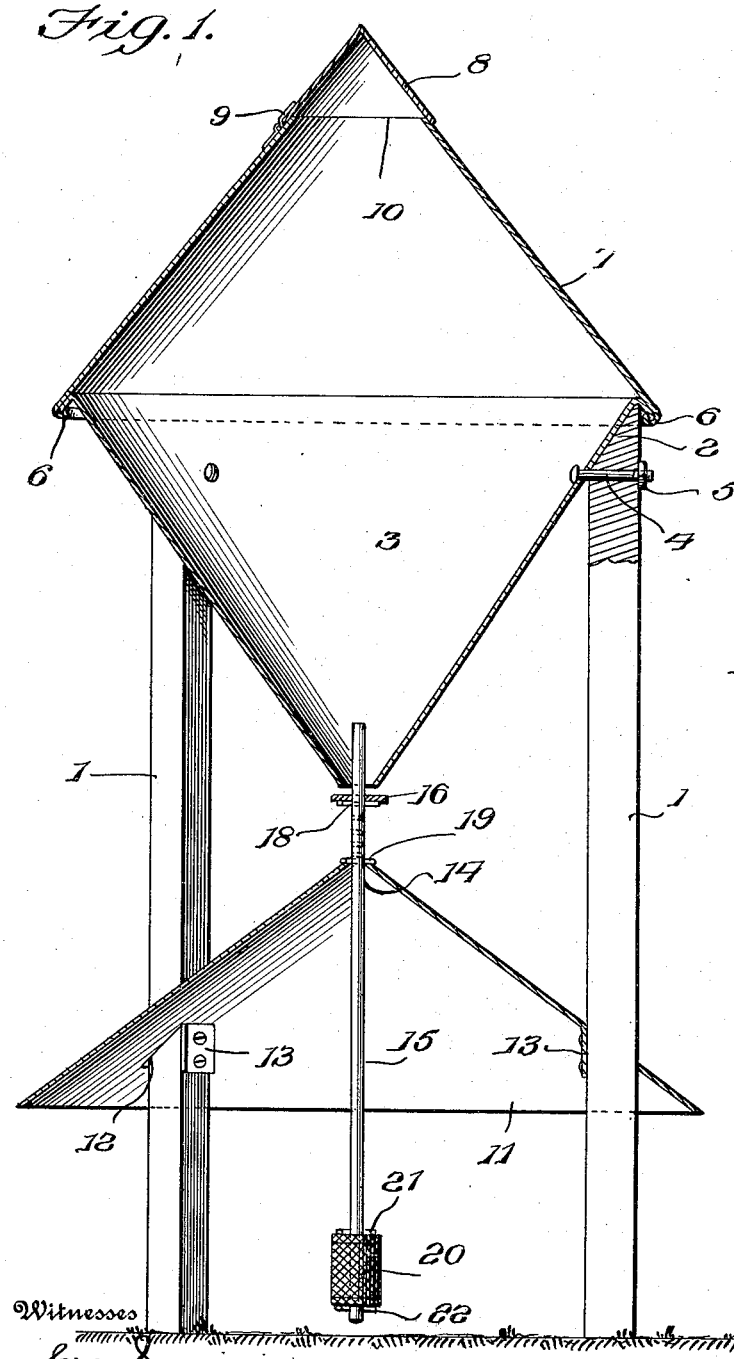
Figure 2:
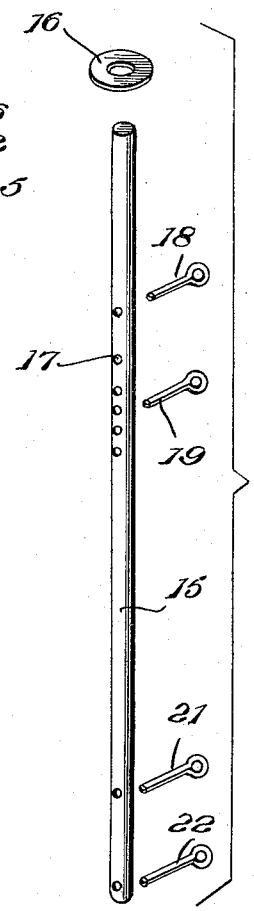

In the drawings, Figure 1 is a vertical sectional view of an apparatus embodying my invention; Fig. 2 is an enlarged detail perspective view of the pendulum rod or agitator.

In carrying out my invention I employ a plurality of posts 1 which are preferably disposed in triangular relation and which may, of course, be of any desired dimensions. The upper ends of these posts are beveled, as shown at 2, upon their inner faces and to the said upper beveled ends I secure a hopper 3 which is of inverted conical form, the lower end of said hopper being open to permit the meal, corn or other feed placed therein to readily escape in the operation of the device. The hopper is secured to the upper ends of the posts by bolts 4, which are inserted outwardly through the wall of the hopper and the post and are equipped with nuts 5 on their outer ends, which are turned home against the posts, as will be readily understood, to firmly secure the hopper in position. The upper end or edge of the hopper is carried downwardly and outwardly, as shown at 6, and to the said downwardly and outwardly turned flange I secure a cover or hood member 7 which is in the form of a truncated cone, a conical cap 8 being secured to the said hood by a hinge 9 and adapted to fit over the truncated upper end thereof so as to protect the same from rain or other elements, as will be readily understood. The conical formation of this cap and the hood effectually sheds rain or snow and the truncated form of the hood furnishes a large opening at 10 through which the feed may be placed in the hopper. To the posts 1 below the hopper, I secure a deflector 11 which is of conical form and has its lower edge extended beyond the posts, as shown clearly in Fig. 1. This deflector is provided with openings, as shown at 12, through which the posts may pass and these openings are formed by striking from the deflector tongues 13 which are bent downwardly, as shown, and rigidly secured to the inner faces of the posts so as to support the deflector in position.

The apex of the deflector is open, as shown at 14, and the pendulum or agitator rod 15 is inserted through the said opening. This pendulum or agitator is preferably a straight cylindrical rod which is inserted upwardly through the opening in the deflector and receives a collar or disk 16 upon its upper end. A series of openings 17 is provided in the said rod near the upper end thereof and after the rod is projected upwardly through the deflector and receives the collar or disk 16 a pin or similar device 18 is inserted through one of the said openings immediately below the said collar so as to support the same, as shown in Fig. 1. The rod is then pushed upward so that its upper extremity will enter the hopper and is adjusted so that the collar or disk 16 will lie more or less closely against the lower end of the hopper so as to serve as a valve for the same. After the rod has been thus adjusted, a second pin 19 is inserted through an opening 17 immediately above the deflector so that by engaging the upper end of the deflector it will serve as a pivot to support the rod and permit free movement of the same in all directions. As the rod is vibrated or oscillated its upper end, of course, will agitate or stir the contents of the hopper at the lower end thereof so that said contents will flow freely through the lower end of the hopper without tending to choke the same. The rapidity of the flow will, of course, be regulated by the adjustment of the collar or disk 16 which serves the purpose of a valve to permit or cut off the flow. Upon the lower end of the rod 15 I mount a bait-box 20 which may be of any suitable construction but is preferably a cylinder of wire netting through which corn or other feed placed in the box may be easily seen by the fowls. This box is supported upon the rod 15 by pins or similar devices 21 and 22 inserted through the rod against and respectively above and below the ends of the same, as clearly shown.

It is thought the use and advantages of the apparatus will be readily understood from the foregoing description taken in connection with the accompanying drawing. The device is set up in the poultry yard and the feed placed in the hopper, the pendulum or agitator rod being adjusted so that the valve 16 will be in the proper position relative to the outlet or lower end of the hopper. The fowls will naturally attempt to withdraw feed from the bait-box and their efforts to do so will oscillate the pendulum so that the upper end thereof will agitate the feed in the hopper and cause the same to escape. The escaping feed will strike the deflector 11 and will be turned outwardly by the same so that it will fall to the ground at some little distance from the bait box and will be scattered sufficiently to permit a number of the fowls to feed at one time and give them needed exercise in moving after the food. As only a small amount of the food will be permitted to escape at any one time waste of the same is prevented.

The device is exceedingly simple in the construction and arrangement of its parts and may be manufactured and sold at a low cost, while it is not liable to get out of order and will, therefore, not need constant attention upon the part of the owner.

Having thus described the invention what is claimed as new is:—

1. The combination of a hopper, a deflector below the hopper, and an agitator rod supported by the deflector and vibrating freely in all directions within the lower end of the hopper.

2. The combination of a hopper having an outlet opening in its lower end, a conical deflector below the hopper, an agitator rod inserted through the apex of the deflector and through the outlet opening in the hopper, a valve mounted upon said rod below the hopper, an adjustable support for said valve carried by the said rod, and an adjustable support for the rod adapted to rest upon the apex of the deflector.

3. The combination of a hopper, a deflector below the hopper, an agitator rod inserted upwardly through the deflector and into the hopper and provided with a longitudinal series of openings, a pin inserted through one of said openings and adapted to rest upon the top of the deflector to support the rod, a valve mounted upon the rod, and a pin inserted through another of said openings to support said valve.

4. The combination of a downwardly tapered hopper having an open lower end, a conical deflector disposed below the hopper and in spaced relation thereto and having an open apex, an agitator rod inserted through the open apex of the deflector and through the open lower end of the hopper, the lower end of said agitator rod being disposed below the deflector, an adjustable support for the said rod resting upon the apex of the deflector and supporting the rod for oscillatory movement, and a valve adjustably mounted upon the said rod below the open lower end of the hopper and normally in proximity thereto.

In testimony whereof I affix my signature in presence of two witnesses.

SIMON F. ZENGER. [L. S.]

Witnesses:
FRED M. KILBOURNE,
F. H. LOCKWOOD.

Copies of this patent may be obtained for five cents each, by addressing the "Commissioner of Patents, Washington, D. C."